United States Patent
Salvat Lozano et al.

(10) Patent No.: US 11,522,888 B2
(45) Date of Patent: Dec. 6, 2022

(54) ANOMALY DETECTION AND TROUBLESHOOTING SYSTEM FOR A NETWORK USING MACHINE LEARNING AND/OR ARTIFICIAL INTELLIGENCE

(71) Applicant: NEC Laboratories Europe GmbH, Heidelberg (DE)

(72) Inventors: Josep Xavier Salvat Lozano, Heidelberg (DE); Andres Garcia-Saavedra, Heidelberg (DE); Xi Li, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 826 days.

(21) Appl. No.: 16/459,745

(22) Filed: Jul. 2, 2019

(65) Prior Publication Data

US 2020/0322367 A1    Oct. 8, 2020

Related U.S. Application Data

(60) Provisional application No. 62/827,916, filed on Apr. 2, 2019.

(51) Int. Cl.
*H04L 9/40* (2022.01)
*G06K 9/62* (2022.01)
*H04L 43/00* (2022.01)

(52) U.S. Cl.
CPC .......... *H04L 63/1425* (2013.01); *G06K 9/623* (2013.01); *G06K 9/6256* (2013.01);
(Continued)

(58) Field of Classification Search
CPC . H04L 63/1425; H04L 43/00; H04L 63/1416; H04L 63/1433; G06K 9/623; G06K 9/6256; G06K 9/6264
See application file for complete search history.

(56) References Cited

U.S. PATENT DOCUMENTS 10,645,109 B1 * 5/2020 Lin .................. G06N 5/047
11,194,591 B2 * 12/2021 Toal ................. G06F 9/445
(Continued)

FOREIGN PATENT DOCUMENTS

DE           19820162 A    11/1999
WO      WO 99/12364 A2     3/1999
WO    WO 2018/133924 A1    7/2018

OTHER PUBLICATIONS

Schmidt, Florian et al. "IFTM—Unsupervised Anomaly Detection for Virtualized Network Function Services," 2018 IEEE ICWS, Jul. 2, 2018, pp. 187-194, XP033399069.
(Continued)

*Primary Examiner* — Mohamed A. Wasel
(74) *Attorney, Agent, or Firm* — Leydig, Voit & Mayer, Ltd.

(57) ABSTRACT

A method for anomaly detection and troubleshooting in a network includes parsing a network service descriptor (NSD) describing a network service (NS) to be deployed in the network. Monitoring data including time series of service-level metrics and resource-level metrics of network functions (NFs) of the NS are received from different domains of the network. Representations of the time series from the different domains are learned with a common dimensionality. An NS signature of the NS is computed as a cross-correlation matrix comprising cross-correlations between the service-level metrics and the resource-level metrics of the NFs. Embeddings of the NS signature are learned using a model and determining a reconstruction error of the model. It is determined whether the NS is anomalous based on the reconstruction error of the model. The NS is identified as a target for the troubleshooting in a case that the NS was determined to be anomalous.

15 Claims, 7 Drawing Sheets

(52) U.S. Cl.
CPC ............ *G06K 9/6264* (2013.01); *H04L 43/00* (2013.01); *H04L 63/1416* (2013.01); *H04L 63/1433* (2013.01)

(56) References Cited

U.S. PATENT DOCUMENTS

| | | | | |
|---|---|---|---|---|
| 11,431,741 | B1* | 8/2022 | Lin | G06N 3/08 |
| 2016/0330067 | A1* | 11/2016 | Liu | H04L 41/046 |
| 2018/0027004 | A1 | 1/2018 | Huang et al. | |
| 2018/0324218 | A1* | 11/2018 | Xie | H04L 41/12 |
| 2019/0200400 | A1* | 6/2019 | Liu | H04L 41/0897 |
| 2019/0280942 | A1* | 9/2019 | Côté | H04L 41/40 |
| 2020/0019704 | A1* | 1/2020 | Tora | G06F 21/567 |
| 2020/0210782 | A1* | 7/2020 | Servajean | G06K 9/6218 |
| 2022/0255817 | A1* | 8/2022 | Hong | H04L 43/065 |

OTHER PUBLICATIONS

Sauvanaud, Carla et al. "Anomaly Detection and Root Cause Localization in Virtual Network Functions," 2016 IEEE 27th ISSRE, Oct. 23, 2016, pp. 196-206, XP033018816.

Johan Pelay, et al., "Verifying the configuration of Virtualized Network Functions in software defined networks", IEEE NFV-SDN 2017—The International Workshop on Orchestration for Software-Defined Infrastructures, Dec. 2017, pp. 223-228.

Myung-Ki Shin, et al., "Verification for NFV-enabled Network Services", ICTC 2015, Dec. 2015, pp. 810-815.

Anand Padmanabha Iyer, et al., "Automating Diagnosis of Cellular Radio Access Network Problems", Paper Session II: Can You Hear Me Now?, MobiCom '17, Oct. 16-20, 2017, pp. 79-87.

Anand Padmanabha Iyer, et al., MobiCom '18, Oct. 29-Nov. 2, 2018, pp. 1-16.

Haifeng Chen, et al., Exploiting Local and Global Invariants for the Management of Large Scale Information Systems, 2008 Eighth IEEE International Conference on Data Mining, Dec. 2008, pp. 113-122.

Ke Zhang, et al., "Automated IT System Failure Prediction: A Deep Learning Approach", 2016 IEEE International Conference on Big Data (Big Data), Dec. 2016, pp. 1291-1300.

Boxiang Dong, et al., "GID: Graph-based Intrusion Detection on Massive Process Traces for Enterprise Security Systems", arXiv:1608.02639v1 [cs.CR], Aug. 8, 2016, pp. 1-11.

Chaoyun Zhang, et al., "ZipNet-GAN: Inferring Fine-grained Mobile Traffic Patterns via a Generative Adversarial Neural Network", arXiv:1711.02413v1 [cs.NI], Nov. 7, 2017, pp. 1-13.

Chaoyun Zhang, et al., "Long-Term Mobile Traffic Forecasting Using Deep Spatio-Temporal Neural Networks", arXiv:1712.08083v1 [cs.NI], Dec. 21, 2017, pp. 1-10.

* cited by examiner

ANOMALY DETECTION AND TROUBLESHOOTING SYSTEM FOR A NETWORK USING MACHINE LEARNING AND/OR ARTIFICIAL INTELLIGENCE

CROSS-REFERENCE TO PRIOR APPLICATION

Priority is claimed to U.S. Provisional Application No. 62/827,916 filed on Apr. 2, 2019, the entire contents of which is hereby incorporated by reference herein.

FIELD

The present invention relates to methods and systems which use machine learning (ML) and/or artificial intelligence (AI) for detecting and troubleshooting anomalies in a network, in particular with respect to the provision of network services in a telecommunications network for identifying and solving issues with network functions and/or to support network slicing orchestration.

BACKGROUND

One of the main goals of 5G is to open up the infrastructure to vertical sectors (e.g. automotive, health, construction) traditionally alien to the telco industry as a means to enable new services and boost revenue. Vertical service providers would be able to deploy their services by means of deploying Network Services (NSs) (as defined in ETSI Network Function Virtualization (NFV)) on top of the same infrastructure. In this way, it is envisioned that 5G will support a large scope of services ranging from augmented reality applications, which require low latency communication services, to streaming services demanding a huge amount of bandwidth. The ability to deploy and manage multiple NSs concurrently is key to support network slicing. In this context, orchestration of NSs is crucial to automate the process of programming the behavior of vertical-tailored mobile networks.

NSs are usually described using Network Service Descriptors (NSDs), the concept of which is illustrated in FIG. 1 as NSD 10, which portray the set of Physical and Virtual Network Functions (PNFs/VNFs) 12 that compose an NS and its interconnections in the mobile communication network. NSD 10 may also include information on the Service-Level Agreement (SLA) or methods for monitoring certain service-level metrics. The PNFs/VNFs 12 can be implemented within the mobile network infrastructure and connected to each other as shown in FIG. 1 to define the NS. Different PNFs/VNFs 12 can be implemented by base stations (BSs) 14, middleboxes 15, switches 16, core network functions 17 (e.g., evolved packet core (EPC), and any PNF/VNF provided by vertical service provider that provides a functionality related to the service offered as vertical-owned functions 18, in order to execute one or more NSs as a whole to provide the NS.

FIG. 2 depicts the system architecture of a mobile network illustrates how an NSD 10 can be parsed by an orchestrator entity 20 that deploys and configures PNFs/VNFs 12 among the different domains that a mobile network is composed of. The mobile network infrastructure is comprised of three domains 21: (i) a radio access network (RAN) domain composed of multiple BSs 14 as RAN nodes 23 that provide radio connectivity to the end users, (ii) a transport domain composed of different middleboxes 15, switches 16 and aggregation levels constituting transport nodes 25 (this domain can be further decomposed per technology domain) and (iii) a core domain composed of one or more data centers as core nodes 27 where virtual machines (VMs) or containers may be deployed and interconnected. Each domain may have one or several controllers 22, 24, 26 that control the underlying respective data plane equipment or nodes 23, 25, 27 through different protocols (e.g. OpenFlow, P4 etc.). These controllers 22, 24, 26 can setup different configurations and tune certain parameters on the respective underlying nodes 23, 25, 27. An end-to-end network orchestrator entity 20 is placed on top of these local controllers 22, 24, 26 and manages the underlying resources from a multi-domain and multi-user perspective to accommodate different NSs by communicating with domain controllers. That is, the network orchestrator entity 20 abstracts the capabilities of each of the domains 21 and takes decisions on the values of the configuration of the underlying equipment in the different domains 21. The domain controllers 22, 24, 26 possess a set of control mechanisms to change the configuration of the underlying domain's PNF/VNFs.

For orchestrating different NSs, anomaly detection can be used to identify potential problems. FIG. 3 depicts the logic of a state-of-the-art an anomaly detection mechanism 30. Existing anomaly detection solutions focus on monitoring several aggregated Key Performance Indicators (KPIs) per domain 21. Controllers 22, 24, 26 receive monitoring data 28 from the respective underlying nodes 23, 25, 27 and pass this data to a KPI monitoring module 32, which aggregates the data and creates a vector of features 33. Afterwards, this data feeds a model 34 that decides if there is an anomaly. For example, the model 34 could be as simple as a threshold function that outputs 0 ("no anomaly") or 1 ("there is an anomaly") depending on the values of the input features. Network administrators can adjust the normal ranges of KPIs based on domain knowledge and operational experience. Once a KPI is persistently out of its normal range, an alarm 36 is raised and a trouble ticket is created. Afterwards, network administrators investigate the root cause of this behavior. Root causes are usually examined checking manually hardware logs or performing field trials.

Pelay, J., et al., "Verifying the configuration of virtualized network functions in software defined networks," 2017 IEEE Conference on Network Function Virtualization and Software Defined Networks (NFV-SDN), Berlin, pp. 223-228 (2017) and Shin, M., et al., "Verification for NFV-enabled network services," 2015 International Conference on Information and Communication Technology Convergence (ICTC), Jeju, pp. 810-815 (2015), each of which are hereby incorporated by reference herein, propose an offline method for checking the NSDs so that network functions are correctly described. They check that there are no loops on the VNF forwarding graphs and that VNFs are correctly verified before deploying them in the mobile network.

Padmanabha Iyer, A., et al., "Automating Diagnosis of Cellular Radio Access Network Problems," Proceedings of the 23rd Annual International Conference on Mobile Computing and Networking, ACM (2017) and Padmanabha Iyer, A., et al., "Mitigating the Latency-Accuracy Trade-off in Mobile Data Analytics Systems," Proceedings of the 24th Annual International Conference on Mobile Computing and Networking, ACM (2018), each of which are hereby incorporated by reference herein in their entirety, discuss a model that tries to explain why KPIs in a RAN are out of its normal range leading to a faster troubleshooting. Chen, Haifeng, et al., "Exploiting local and global invariants for the management of large scale information systems," Eighth IEEE International Conference on Data Mining, IEEE (2008), which is hereby incorporated by reference herein in its entirety, propose a method that learns the invariant relationships between time series data and exploit the knowledge on those relationships to detect different anomalies.

Zhang, Ke, et al., "Automated IT system failure prediction: A deep learning approach," IEEE International Conference on Big Data (Big Data), IEEE (2016), which is hereby incorporated by reference in its entirety, propose to train a model that reads the different logs that are generated by the different components of a mobile network and try to predict future problems. Dong, Boxiang, et al., "GID: Graph-based Intrusion Detection on Massive Process Traces for Enterprise Security Systems," arXiv preprint arXiv: 1608.02639 (2016), which is hereby incorporated by reference herein in its entirety, develop a graph-based intrusion detection system.

Furthermore, anomaly detection is also closely related to traffic prediction as comparing the predicted traffic in a region with the current measurements helps in detecting anomalous regions where the data consumption is irregularly high. Zhang, C. et al., "Zipnet-gan: Inferring fine-grained mobile traffic patterns via a generative adversarial neural network," Proceedings of the 13th International Conference on emerging Networking Experiments and Technologies, ACM (2017) and Zhang, C. et al., "Long-term mobile traffic forecasting using deep spatio-temporal neural networks," Proceedings of the Eighteenth ACM International Symposium on Mobile Ad Hoc Networking and Computing, ACM (2018), each of which are hereby incorporated by reference herein in their entirety, develop a method for traffic prediction in a mobile network using deep learning algorithms. In Zhang, C. et al., "Zipnet-gan: Inferring fine-grained mobile traffic patterns via a generative adversarial neural network," Proceedings of the 13th International Conference on emerging Networking Experiments and Technologies, ACM (2017), image super-resolution techniques are applied to mobile traffic to develop a method for short-time traffic predictions. In Zhang, C. et al., "Long-term mobile traffic forecasting using deep spatio-temporal neural networks," Proceedings of the Eighteenth ACM International Symposium on Mobile Ad Hoc Networking and Computing, ACM (2018) a method is proposed for predicting long time traffic patterns.

SUMMARY

In an embodiment, the present invention provides a method for anomaly detection and troubleshooting in a network. A network service descriptor (NSD) describing a network service (NS) to be deployed in the network is parsed. Monitoring data including time series of service-level metrics and resource-level metrics of network functions (NFs) of the NS are received from different domains of the network. Representations of the time series from the different domains are learned with a common dimensionality so as to match different time scales of the time series. An NS signature of the NS is computed as a cross-correlation matrix comprising cross-correlations between the service-level metrics and the resource-level metrics of the NFs. Embeddings of the NS signature are learned using a model and determining a reconstruction error of the model. It is determined whether the NS is anomalous based on the reconstruction error of the model. The NS is identified as a target for the troubleshooting in a case that the NS was determined to be anomalous

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
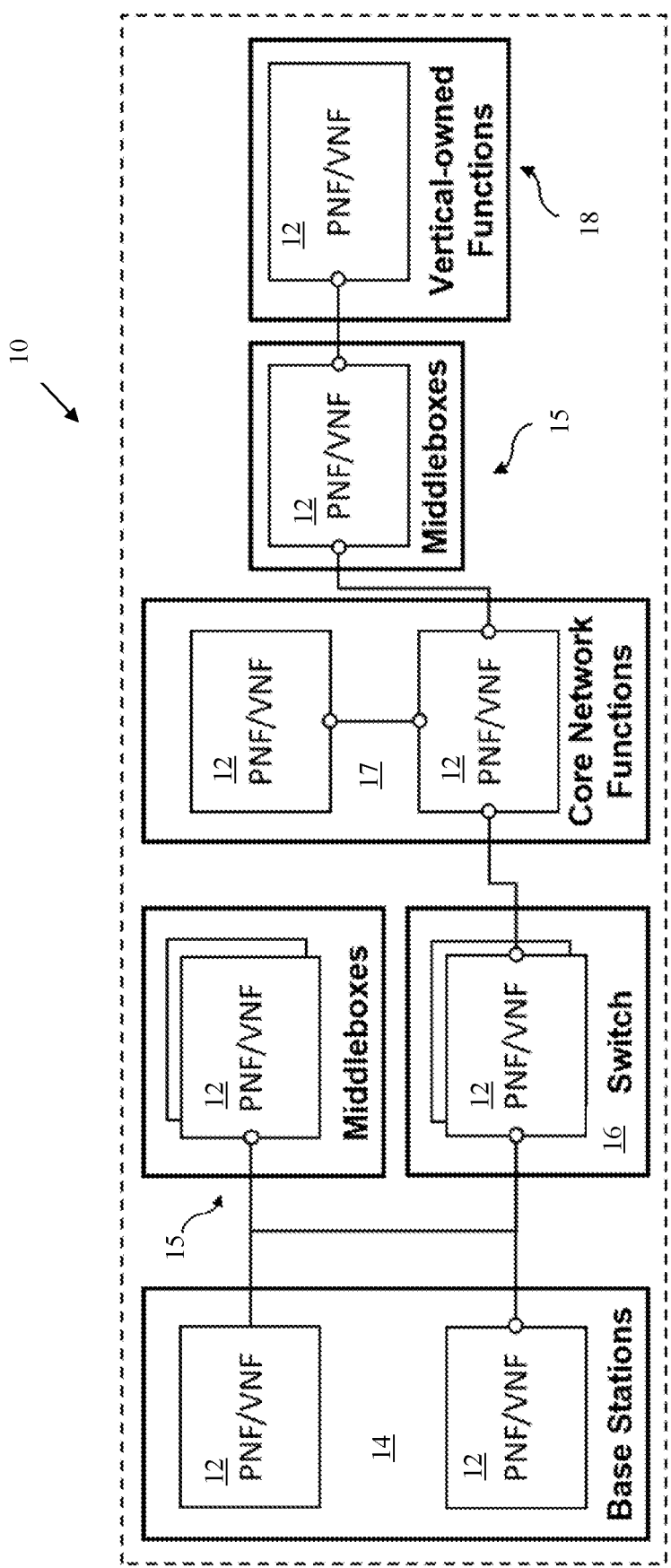
FIG. 1 is a schematic system overview of a typical NSD.
Figure 2:
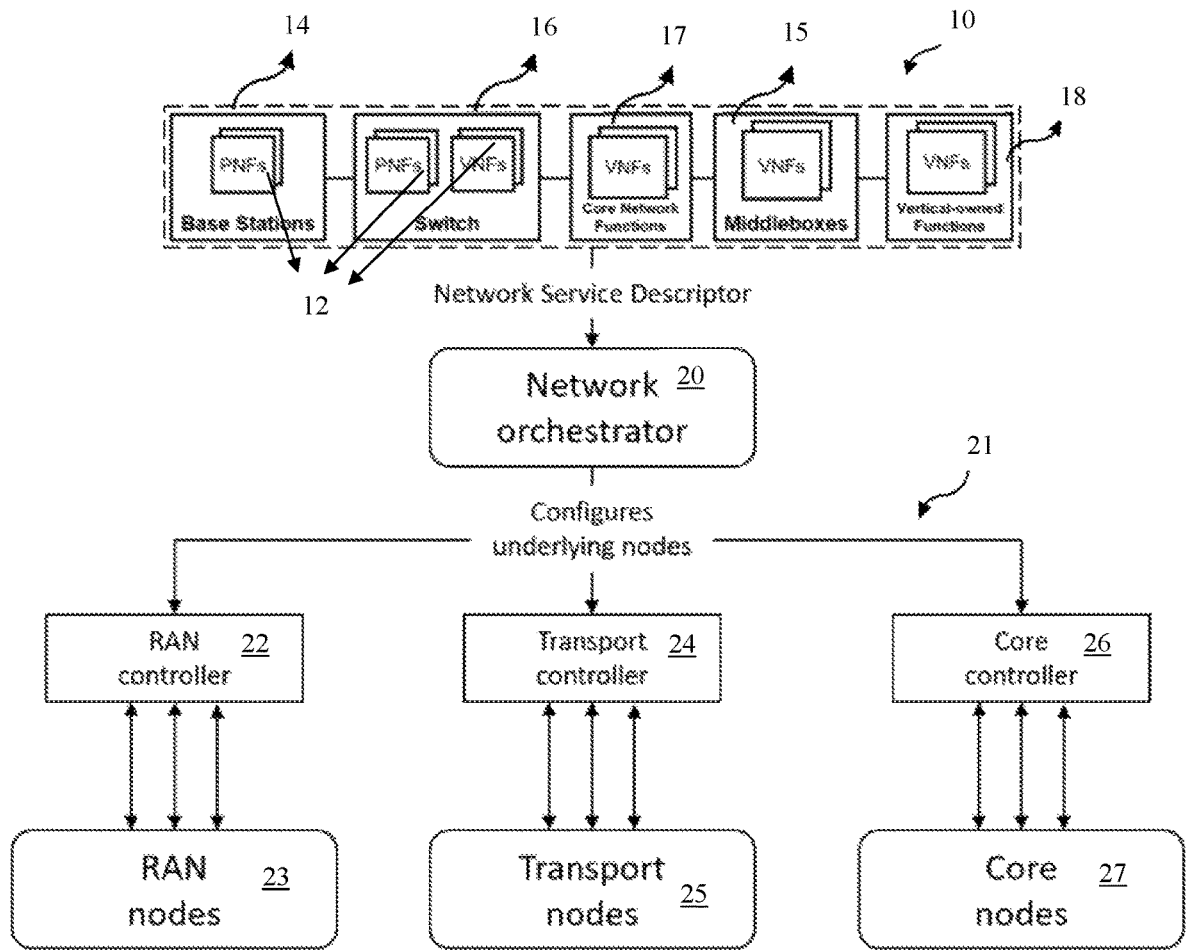
FIG. 2 is a schematic system overview of a typical mobile network architecture implementing a typical NSD.
Figure 3:
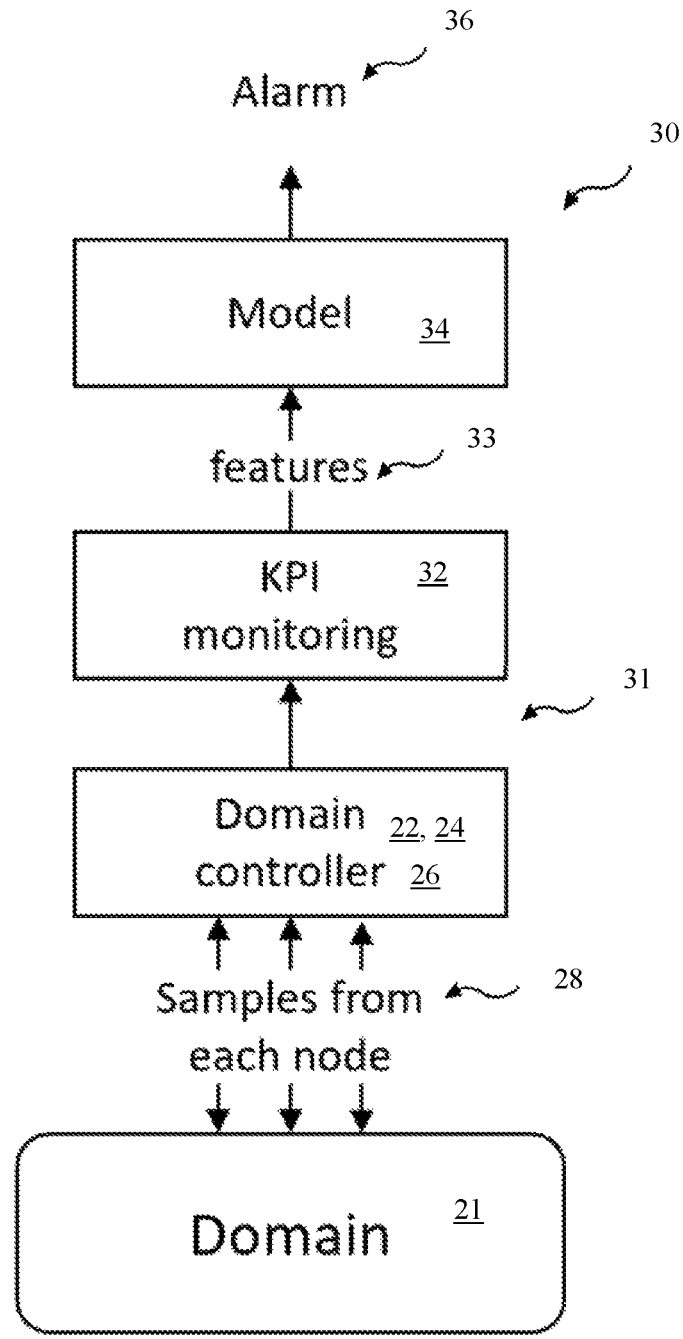
FIG. 3 is a schematic overview showing the logical flow of a state-of-the-art anomaly detection mechanism.

Common monitored KPIs in a mobile network include call drop rates at different BSs, the number of dropped packets in the transport links or the storage uptime in data centers among others. The normal range of values of these KPIs are configured taking into account the SLAs between an operator and a vertical service provider. Usually, SLAs are either negotiated before the deployment of an NS or defined in the NSD. However, any vertical service provider that wishes to deploy an NS might not have an end-to-end view and cross-domain knowledge as to what the normal KPIs values should be. Furthermore, permitting vertical service providers to identify and troubleshoot problems quickly and automatically can help the system operate more effectively, with less technical problems, and allows the service providers to provide higher levels of customer satisfaction.

Embodiments of the present invention advantageously provide to learn non-anomalous relationships between monitored metrics of PNFs/VNFs that compose a NS in each domain during a training phase, and to detect anomalous relationships when they occur during an operational phase. In contrast to state-of-the-art approaches, embodiments of the present invention do not only monitor (aggregated) KPI (features) time series and address anomalous trends of the feature time series. Instead, according to embodiments of the present invention, NS signatures per NS are computed taking into account the design structure of the respective NSs. In detail, the NS signatures capture the cross-correlations and long-term dependencies using virtual resource-level and service-level data of each NF that compose a NS. Further, embodiments of the present invention learn an embedding of the NS signatures taking into account the NS structure and uses the reconstruction error to detect anomalies in deployed NSs. The reconstruction errors of the NSs can then be used in an advantageous manner to find the root causes of a problem or can be used for classification into known problems.

According to an embodiment, the present invention provides a method for anomaly detection and troubleshooting in a network, comprising: parsing a network service descriptor (NSD) describing a network service (NS) to be deployed in the network; receiving monitoring data including time series of service-level metrics and resource-level metrics of network functions (NFs) of the NS from different domains of the network; learning representations of the time series from the different domains with a common dimensionality so as to match different time scales of the time series; computing an NS signature of the NS as a cross-correlation matrix comprising cross-correlations between the service-level metrics and the resource-level metrics of the NFs; learning embeddings of the NS signature using a model and determining a reconstruction error of the model; determining whether the NS is anomalous based on the reconstruction error of the model; and identifying the NS as a target for the troubleshooting in a case that the NS was determined to be anomalous.

In a same or different embodiment, the method further comprises adding contextual information to the NS signature.

In a same or different embodiment, the method further comprises configuring domain controllers of the different domains of the network based on the NSD to monitor the service-level metrics and resource-level metrics of the NFs of the NS.

In a same or different embodiment, the representations of the time series are learned by auto-encoders, each of the auto-encoders having been trained to learn a respective one of the representations of a respective one of the time series with the common dimensionality such that a higher-dimensional representation is learned for time series having a longer timescale relative to the common dimensionality and lower-dimensional representation is learned for time series having a shorter timescale relative to the common dimensionality.

In a same or different embodiment, the method further comprises classifying the anomalous NS into a type of problem based on the reconstruction error of the model and a supervised learning algorithm using prior knowledge of reconstruction errors associated to known problem types.

In a same or different embodiment, the model is trained to learn the embeddings in three different levels including an embedding of the NS signature per NF, a shared embedding of the NFs per domain of the network, and a shared embedding of all the NFs of the NS.

In a same or different embodiment, the method further comprises identifying anomalies per network slice.

In a same or different embodiment, computing the NS signature further comprises: computing cross-correlations within the time series of the resource-level metrics of a same one of the NFs; computing cross-correlations between the service-level metrics and the resource-level metrics of the same one of the NFs; computing cross-correlations within the time series of the service-level metrics of the NFs; and computing long-term dependencies of each of the time series.

In a same or different embodiment, the method further comprises ranking the reconstruction error of the NS with reconstruction errors of other NSs, and using the ranking to identify hardware logs and configuration files for inspection.

In a same or different embodiment, the method further comprises training the model using reconstruction errors from NSs which have undergone the troubleshooting.

In a same or different embodiment, the NS signature is computed for different size windows of time.

In another embodiment, the present invention provides a computer system for anomaly detection and troubleshooting in a network, the system comprising memory and one or more processors which, alone or in combination, are configured to provide for execution of a method comprising: parsing a network service descriptor (NSD) describing a network service (NS) to be deployed in the network; receiving monitoring data including time series of service-level metrics and resource-level metrics of network functions (NFs) of the NS from different domains of the network; learning representations of the time series from the different domains with a common dimensionality so as to match different time scales of the time series; computing an NS signature of the NS as a cross-correlation matrix comprising cross-correlations between the service-level metrics and the resource-level metrics of the NFs; learning embeddings of the NS signature using a model and determining a reconstruction error of the model; determining whether the NS is anomalous based on the reconstruction error of the model; and identifying the NS as a target for the troubleshooting in a case that the NS was determined to be anomalous.

In a same or different embodiment, the system further comprises a troubleshooting classifier trained to classify the anomalous NS into a type of problem based on the reconstruction error of the model, the troubleshooting classifier having been trained by a supervised learning algorithm using prior knowledge of reconstruction errors associated to known problem types.

In a same or different embodiment, the system further comprises a monitor controller having access to the NSD and being operable to configure domain controllers of the different domains of the network based on the NSD to monitor the service-level metrics and resource-level metrics of the NFs of the NS.

In a further embodiment, the present invention provides a tangible, non-transitory computer-readable medium having instructions thereon, which upon execution by one or more processors, alone or in combination, provide for execution of a method for anomaly detection and troubleshooting in a network comprising: parsing a network service descriptor (NSD) describing a network service (NS) to be deployed in the network; receiving monitoring data including time series of service-level metrics and resource-level metrics of network functions (NFs) of the NS from different domains of the network; learning representations of the time series from the different domains with a common dimensionality so as to match different time scales of the time series; computing an NS signature of the NS as a cross-correlation matrix comprising cross-correlations between the service-level metrics and the resource-level metrics of the NFs; learning embeddings of the NS signature using a model and determining a reconstruction error of the model; determining whether the NS is anomalous based on the reconstruction error of the model; and identifying the NS as a target for the troubleshooting in a case that the NS was determined to be anomalous.

Figure 4:
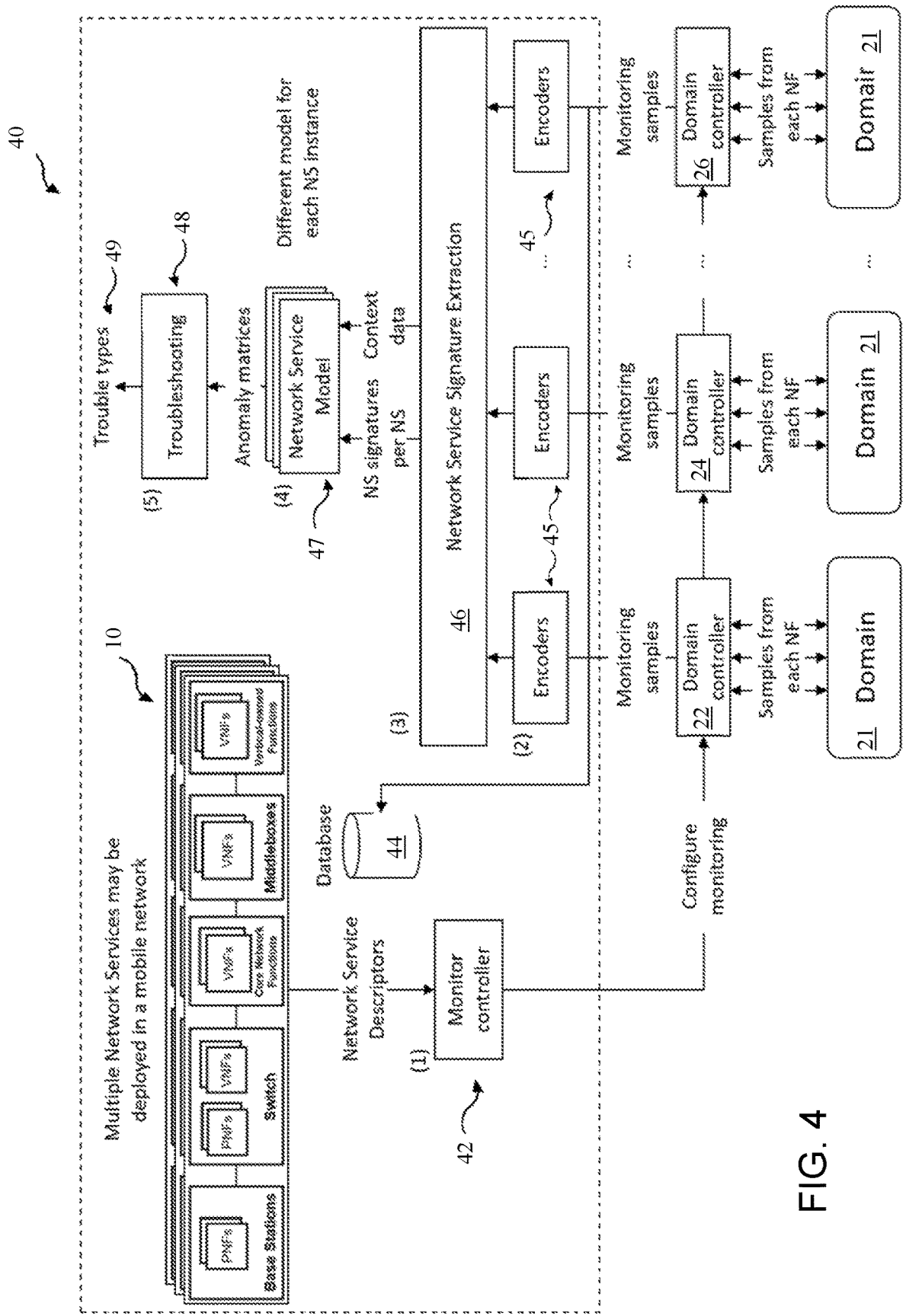
FIG. 4 is a schematic overview of a system and method for detecting anomalies according to an embodiment of the present invention including the functional blocks.

FIG. 4 shows the functional blocks and workflow of an anomaly detection and troubleshooting system 40 according to an embodiment of the present invention. It is assumed that an NSD 10 describing an NS has been constructed and deployed previously by a network or NS orchestrator, or similar, and that a monitor controller 42 has access to the NSD (see step (1) in FIG. 4). The system 40 is not limited to detecting anomalies on a single NS, but rather it may run over multiple NSs concurrently. As mentioned above, an NSD 10 characterizes all PNFs and VNFs the NS is composed of and the service-level metrics that can be monitored. In detail, which specific resource-level metrics to monitor depend on the type of hypervisor (e.g., Kernel-based Virtual Machine (KVM), AWS, Hyper-V, vSphere), container (Docker), etc., used to deploy each PNF/VNF. For example, the resource-level metrics available are different for a virtual switch (packets/bytes received, packets/bytes transmitted etc.) than a service deployed on a VM (virtual CPU usage, storage uptime etc.). On the other hand, the vertical customer can specify which service-level metrics may be retrieved from different monitoring agents inside the VNFs/PNFs. With this information, the monitor controller 42 configures the respective monitoring agents across all domain controllers 22, 24, 26 in the mobile network so that the respective specified service-level metrics are monitored in the respective domains 21. Examples of virtual resource-level data collected are time series of virtual CPU utilization of a specific VNF, radio resource usage of radio access points PNFs or bytes received in virtual network links. Examples of service-level data collected are the number of total connections to a web server or the number of queries per minute of a MySQL server. Time series are saved into a database 44, so that raw metrics can be retrieved any time.

There are many different options to implement the monitoring agents in the different domains 21. For instance, on the radio part, the radio access point (RAP) may support sending periodic information about the radio resource usage, channel information and interference status via proprietary interfaces. On the transport part, sFlow is the industry standard to measure network traffic. The OpenFlow protocol also provides support for monitoring counters. Finally, on the core domain it is possible to leverage network equipment monitoring facilities such as Ceilometer or Telegraf (a server agent for collecting metrics from network equipment) to measure CPU and memory consumption among other parameters of VMs deployed on data centers. To measure service-level metrics, Telegraf or Collectd (a Unix daemon that collects, transfers and network equipment performance information) might be used as monitoring agents inside the different PNFs/VNFs. Both have a variety of plugins that embrace various types of services. An implementation example of the database is, for example, influxDB or Elasticsearch along with a data collection engine such as Logstash.

The inventors have recognized a key problem that arises when monitoring from different domains 21. The monitoring capabilities of the different PNFs/VNFs that compose the NS may produce time series with very different sample rates. For example, current commercial eNodeBs (eNBs) monitor the aggregated radio resource usage every 5 minutes. Transport network monitoring agents such as sFlow have a configurable monitoring sampling rate that is tuned depending on the link speed. Finally, in data centers, metric granularity depends on the monitoring agent configured in each NF. Therefore, monitored metrics will likely have different sample rates. Embodiments of the present invention advantageously provide to adapt to all the different time scales across domains 21 to be able to develop an effective anomaly detection and troubleshooting system 40. Preferably, embodiments of the present invention tackle this problem using encoders 45, in particular auto-encoders. As illustrated by step (2) in FIG. 4, an auto-encoder, for each time series, learns a new representation of the time series with a common dimensionality D across all the time series. Accordingly, a higher-dimensional representation is learned if time series have larger timescales compared to the baseline dimension D. Otherwise, a lower-dimensional representation is learned. Kingma, Diederick P., et al., "Auto-encoding variational bayes," arXiv preprint arXiv: 1312.6114 (2013), which is hereby incorporated by reference herein in its entirety describe auto-encoders.

Figure 5:
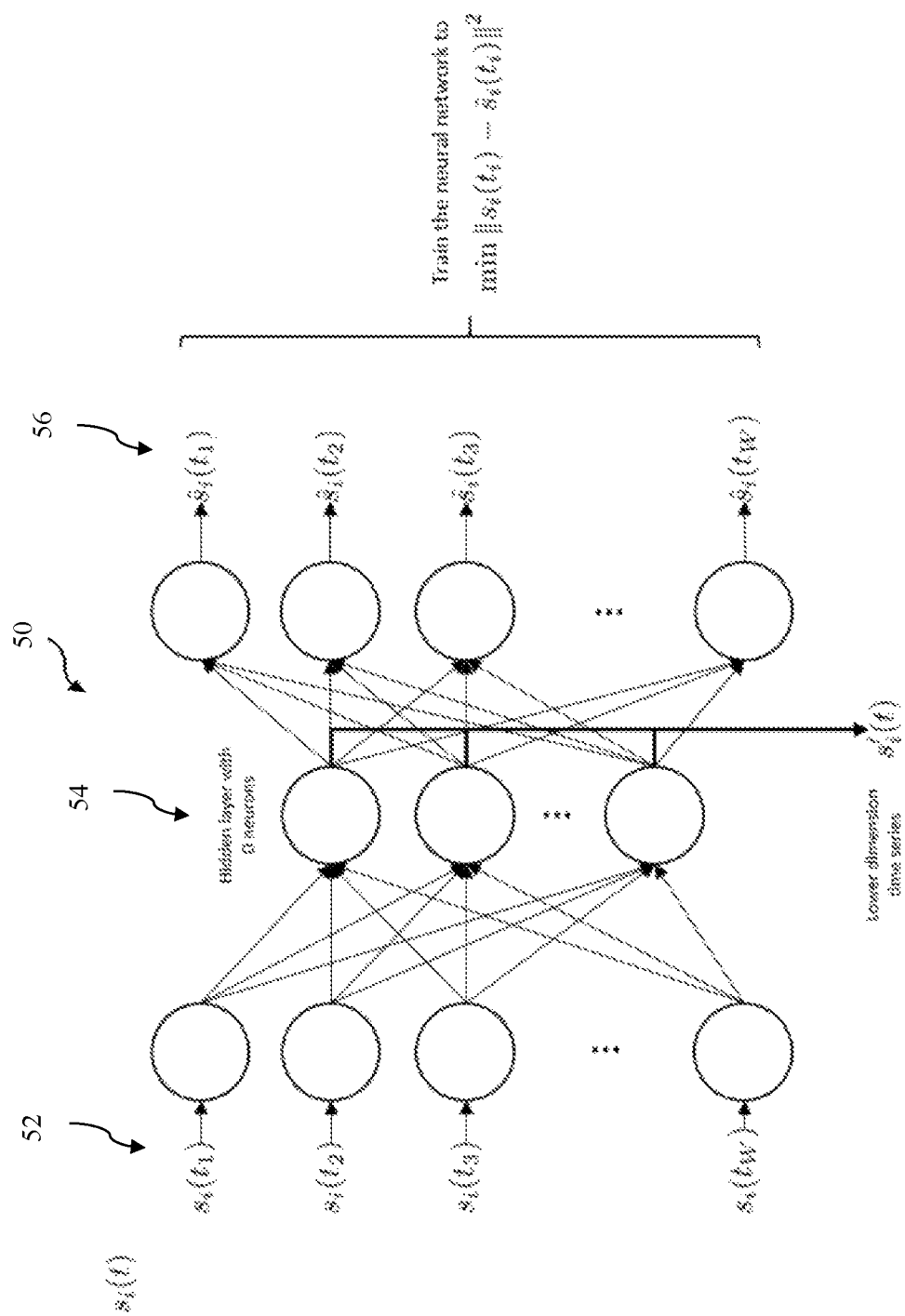
FIG. 5 shows an example on how to embed a time series in a lower dimension space.

According to one embodiment for learning using the auto-encoders, or an analogous process to auto-encoders, which is schematically illustrated in FIG. 5, the input is a time series s(t) for which there are W samples and the goal is to embed it in a lower dimensional with dimensionality D where D<W. A neural network 50 is used which in its input 52 takes W samples of s(t). The neural network 50 further includes a set of hidden layers, in which every layer has less neurons than the previous layer but more than D neurons until reaching a layer 54 with exactly D neurons. This part is called the encoder. After that, there are the same number of hidden layers as in the encoder part but with an increasing number of neurons until there is a layer with W neurons. This part is called the decoder. Then, the neurons are trained to minimize the estimation error between the input 52 and output 56 so that the W output values for each neuron provide an estimation of the input values. Therefore, the outputs of the central hidden layer with dimensionality D becomes a low-dimension representation of s(t), represented by s'i(t). Once the neural network 50 is trained, the outputs of the central hidden layer with dimensionality D are used as an input of the system as all the time-series will have the same dimensionality D. An analogous process can be followed to embed s(t) in a higher dimension space. In this way, sample rates across the different time series are balanced. In contrast, state-of-the-art methods do not take into account the unbalanced sample rates of different time series measured in different domains.

Once the controllers 22, 24, 26 can correctly receive the virtual resource-level and service-level monitoring samples for which the representations are learned by the encoders 45, the NS signatures are computed according to embodiments of the present invention. As illustrated in step (3) of FIG. 4, a network service signature extraction module 46 computes the NS signatures for each NS. The network service signature extraction module 46 takes as input the multiple virtual resource-level and service-level time series of each NF of each NS or the representations thereof from the encoders 45.

Once the NS signatures have been computed by the network service signature extraction module 46, as described in further detail below, they are delivered, preferably along with contextual information to an NS model 47, represented in step (4) in FIG. 4. Preferably, the NS model 47 is developed for a particular NS instance deployed in the mobile network and each NS has a different model. The NS model 47 learns an embedding of the NS signatures and the contextual information during a training phase and then detects anomalies using the reconstruction error once it embeds and reconstructs the input NS signatures. Advantageously, in embodiments of the present invention which use multi-level and multi-domain data, a multi-model design is employed for any ML algorithm to be used. In particular, the structure of each ML algorithm first learns the embedding of each of the NFs. Then, it learns a shared embedding of all the NFs within each domain 21. Finally, it learns a shared embedding comprising all the domains 21. In contrast to state-of-the-art methods, embodiments of the present invention therefore take into account the structure of the network service to design a multi-modal NS model 47. For instance, it is possible to build the NS model 47 by learning the embeddings using convolutional neural networks, variable auto-encoders or generative adversarial networks. The output of the NS model 47 is the reconstruction error of the NS signatures per NS. In fact, the reconstruction error represents how anomalous cross-correlations and long-term dependencies of time series are. In detail, after the NS model computes the reconstruction errors per NS, it sorts them per NS in descending order. In this way, vertical service providers can identify which NFs are not functioning as expected. Moreover, network operators may use the anomaly ranking information to decide which hardware logs and configuration files inspect first.

Finally, as illustrated in step (5) in FIG. 4, the reconstruction error output, of the NS model is handed over to a troubleshooting classifier 48. The troubleshooting classifier 48 is trained to label the reconstruction errors scores per NS into different classes or trouble types 49. The classification may be as simple as deciding whether there is an anomaly or not, or more complex, such as mapping the values of the reconstruction errors into real problems using experience on previous known mappings between reconstruction errors and problems. For example, a simple classifier could be implemented by setting up a threshold on the reconstruction error and deciding that there is an anomaly if the value of the reconstruction error is bigger that the threshold. A more complex classifier can be implemented using supervised learning algorithms if the network administrator has been labeling the reconstruction errors with known problems. Algorithms such as Support Vector Machines (SVMs), Tree classifiers or K-Nearest-Neighbors could be used to implement the troubleshooting classifier 48.

Figure 6:
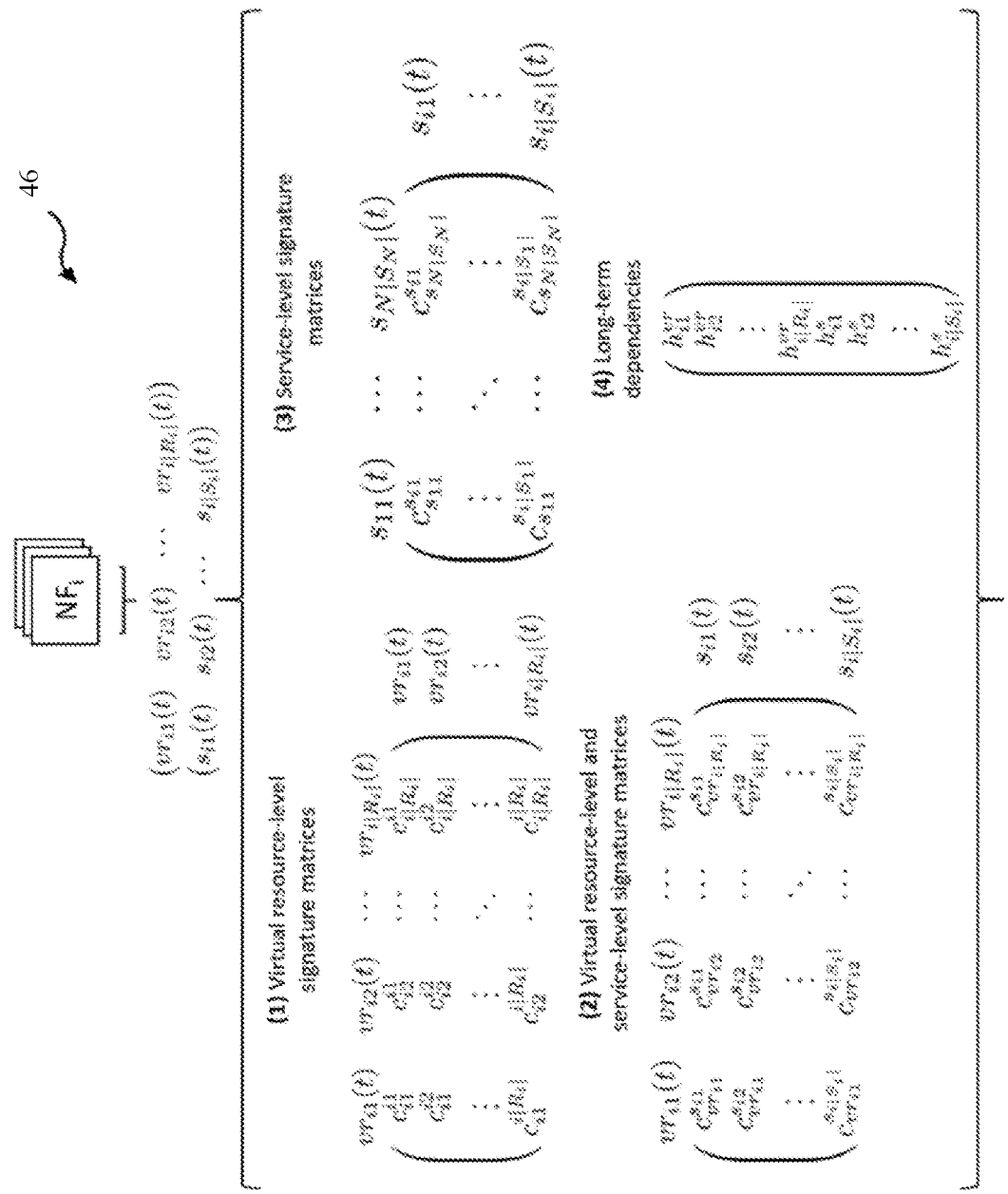
FIG. 6 shows how the Network Service Signature Extraction module of FIG. 4 computes the signatures for each NS according to an embodiment of the present invention.

FIG. 6 shows further details of the network service signature extraction module 46, specifically, how the network service signature extraction module 46 computes the NS signature of an NS composed of N NFs. In detail, FIG. 6 shows that each NF has a vector of IRJ virtual resource-level time series and a vector of $|S_j|$ service-level time series. $vr_i(t)$ represents an individual virtual resource-level time series of NF function i. Similarly, $s_i(t)$ represents an individual service-level time series of NF function i. The NS signatures capture the cross-correlation between different time series and the long-term temporal dependencies of each time series. Furthermore, context information is concatenated to the output NS signatures. According to an embodiment of the present invention, the NS signatures are computed using the following steps:

1. In case of virtual resource-level metrics, an embodiment of the present invention computes the cross-correlations within this group of metrics of time series within the same NF, as shown in step (1) of FIG. 6. The cross-correlation between time series generated at different NFs are ignored. For example, cross-correlation coefficients can be computed using the classical Pearson's correlation coefficient formula. In case that the NS includes a set of BSs, the spatial correlation between them can also be computed using position information of the BSs.
2. Cross-correlations between virtual resource-level metrics and service-level metrics are considered, but they are only computed between the time series generated at the same NF, as shown in step (2) of FIG. 6.
3. In case of service-level metrics, an embodiment of the present invention computes all the cross-correlations within the service-level metrics of a NF and all other service-level metrics, in order to try to capture the whole service dynamics, as shown in step (3) of FIG. 6.
4. Individual long-term dependencies are captured using a long short-term memory (LSTM). The value of last state h is used as a measure of the long-term dependency of each time series, as shown in step (4) of FIG. 6. The state can be determined as the output of the LSTM after training.
5. The network service signature extraction module 46 also gathers the contextual information such as the time of the day, the day of the week, etc. This information can be retrieved in many different ways. For example, the contextual information can be recovered querying a local network time protocol (NTP) server.
6. The NS signatures for the NSs are computed for different window sizes. For example, the NS signatures can be computed for windows of 1 minute, 5 minutes and 10 minutes for each NS.
7. The output of the network service signature extraction module 46 is all the cross-correlations and temporal dependencies computed as described per NS and the contextual information, if provided.

This method of computing the NS signatures is fundamentally different from the state-of-the-art. State-of-the-art methods would compute a giant matrix capturing the cross-correlations between each pair of time series rendering the solution non-scalable in the case of multiple NSs. In contrast, embodiments of the present invention take into account the structure of the NS to add an additional constraint on computing the cross-correlations. In this way, the solution according to embodiments of the present invention is much more scalable. In fact, it is possible to compare the number of cross-correlations using the method according to embodiments of the present invention with state-of-the-art methods. Assuming an NS with N NFs and that each NF is producing R virtual-resource-level time series and S service-level time series, the total computations of state-of-the-art methods would be $N^2 \sim (R+S)^2$ i.e. computing all cross-correlations. Instead, embodiments of the present invention compute $N \sim (R)^2 + N \sim (R \sim S) + (NS)^2$ cross-correlations. By developing both expressions, it can be seen that the state-of-the-art methods make $N \sim (N-1) \sim R^2 + N \sim (2N-1) \sim R \sim S$ more computations. Accordingly, embodiments of the present invention not only provide for greater scalability and flexibility to different technical applications, but also are more computationally efficient, thereby allowing to save memory and computational resources.

Figure 7:
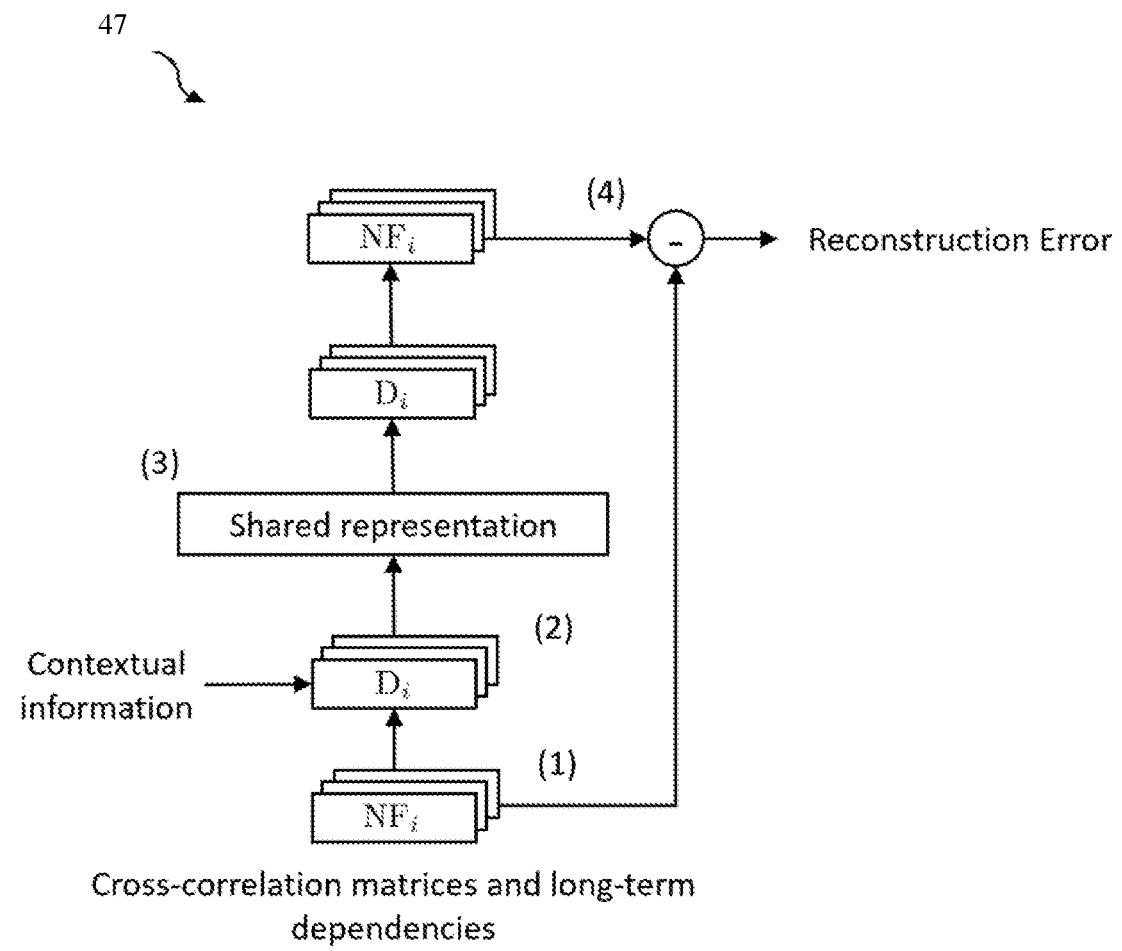
FIG. 7 is a schematic overview of the design structure of an ML algorithm according to an embodiment of the present invention.

FIG. 7 shows further details of a ML algorithm used by the NS model 47 to compute the reconstruction error as an anomaly matrix of the NS. In particular, a ML algorithm is used that combines all the signature matrices for each NF of a NS (NE) and domains (a) and learns a shared representation of the data of the whole network service. Afterwards, the ML algorithm reconstructs the original data from the shared representation and computes the reconstruction error as the difference between the original data and reconstructed data. For example, convolutional neural networks could be used to embed the signature-matrices and learn a shared representation. In fact, it is key according to an embodiment to combine the signature-matrices with the same structure as described in the NSD. First, the NFs signature matrices are embedded for each of the domains together in a shared representation (step (1) of FIG. 7). Second, contextual information is added to that embedding (step (2) of FIG. 7). Third, a common embedding of the previous representation is learned using all the shared representations per domain (step (3) of FIG. 7). Finally, the NFi signature-matrices are reconstructed and the reconstruction error is computed (step (4) of FIG. 7).

Further, embodiments of the invention can be used for the detection of anomalies in the context of network slicing. Network slicing is a novel technique that allows operators to create different isolated networks on top of the same infrastructure via proper abstractions. The objective is to allow operators to offer end-to-end mobile infrastructure resources (radio, transport, and compute) to vertical sectors traditionally alien to the telco industry (e.g., automotive, health, construction). The system according to embodiments of the present invention can be applied per network slice as a network slice can be mapped to a NS. This system allows detecting anomalies and triggering reconfiguration actions per slice. In fact, if an operator has deployed network slices with different priorities, it can search the root causes of an anomaly of a slice in the set of slices with higher priorities.

Even further, embodiments of the present invention can provide mechanisms for continuous learning, for providing mechanisms for periodic retraining of the machine learning models for ranking the NS signatures, the upscaling blocks and the troubleshooting classifier. For example, new data generated after using embodiments of the present invention can be used to retrain its model so that it can yield results that are more accurate. Embodiments of the present invention can also provide a mechanism for knowledge-based learning where operators can record the problems they had to face when a certain anomaly was detected. This enables to develop a much more powerful troubleshooting classifier.

Different embodiments of the present invention can be used to provide for one or more of the following improvements and advantages:

1. A scalable method to compute the NS signatures combining multi-domain data, i.e. virtual resource-level data and service-level data generated at each PNF/VNF, taking into account the underlying structure of each NS. NS signatures capture the dynamics of the NS deployed. Furthermore, NS signatures are enhanced using context information such as the time, day of the week etc. State-of-the-art methods would compute a cross-correlation matrix between all the pairs of metrics rendering the solution non-scalable in the case of multiple Network Services deployed. In contrast embodiments of the invention takes into account the NSs structure.
2. Using auto-encoders to match the different time scales of the different measured time series. Due to the use of multi-domain data, the monitoring capabilities of each NF might be different. That is, time series monitored at different domains might have different sample rates. Encoders learn to embed all time series to a common dimensionality D. Depending on the sample rate of each time series, each auto-encoder will learn a lower or higher dimensional representation of each of the time series so that cross-correlations can be computed using series with equal sample sizes. In contrast, state-of-the-art methods do not take into account the different sample rates or interpolate samples linearly.
3. Building a multi-modal NS model using machine learning algorithms that learn an embedding of the NS signatures in three different levels. First, the model learns and embedding of the NS signatures per NF. Second, it learns a shared embedding of all the NFs in the different domains. Finally, it learns a shared embedding of all the NFs of the NS. In contrast, state-of-the-art techniques do not take into account the structure of different NFs or the domain structure.
4. A troubleshooting classifier that labels the reconstruction errors that the NS model outputs per NS to known trouble types. This can be done in different ways depending on the knowledge of the relations between reconstruction errors and problems.

Applying the anomaly detection architecture for network slicing. As network slices can be mapped to NSs, an operator that has several slices deployed in a mobile network can use the system to find anomalies per slice. In contrast, state-of-the-art methods do not leverage having different slices and search for anomalies within the whole network. Specifically, traditional methods do not differentiate among different NSs. Embodiments of the invention, in contrast, can advantageously find anomalies per network slice as the model is applied per network service that is mapped to a network slice. According to an embodiment of the present invention, a method for anomaly detection comprises:

1. Parsing the NSD and talking to the domain controllers to configure the monitoring processes in the deployed NFs of a NS;
2. Gathering multi-domain monitoring data including virtual resource-level and service-level data from all the NFs deployed of a NS in the different domains;
3. Using auto-encoders to match the different sample sizes of the different time series. Auto-encoders will learn a higher-dimensional or lower-dimensional representation depending on the time scales of each time series;
4. Computing the NS signatures that comprise the cross-correlations between the virtual resource-level metrics and service-levels metrics as well as the long-time temporal dependencies of the different time series;
5. Optionally, adding contextual information to the NS signatures;
6. Using an NS model to embed the NS signatures and contextual information and recover the NS signatures; and
7. Using the reconstruction error of the NS model to model the degree to which a deployed NS is anomalous.

Preferably, contextual information is added to the NS signatures. Also preferably, a troubleshooting classifier is used that labels reconstruction errors into different types of known problems.

According to an embodiment of the present invention, a mechanism for knowledge base is provided that allows network administrators to label reconstruction errors with known trouble types.

According to an embodiment of the present invention, a mechanism is provided to retrain the NS models and the troubleshooting classifier periodically with new data so that they do not lose their accuracy over time.

In contrast to state-of-the-art approaches, embodiments of the present invention do not only monitor (aggregated) KPI (features) time series and address anomalous trends of the feature time series. Instead, embodiments of the present invention learn the normal relationship between the different time series and detect anomalies when the time series do not follow the expected relationships. The novel technique for extracting each of the NS status is referred to herein as the NS Signatures. In contrast to the state-of-the-art approaches, the proposed solution according to embodiments of the present invention is much more scalable in the presence of multiple NSs deployed. Furthermore, embodiments of the present invention provide a ML algorithm design that takes into account the structure of the NS and the different domains of the mobile network.

Embodiments of the present invention provide that the training is from data belonging to the network where the NS is deployed, since accuracy depends on the amount of training data and on the type of data available to monitor.

Embodiments of the present invention can be used, for example, in vertical-targeted network products and telecom carriers.

Compared to other approaches, such as trying to detect problems in each of the domains separately, embodiments of the present invention utilize significantly less computational resources and result in a much faster diagnosis. Also, compared to approaches which compute a giant cross-correlation matrix, the solution according to embodiments of the present invention are scalable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for anomaly detection and troubleshooting in a network, comprising:
    parsing a network service descriptor (NSD) describing a network service (NS) to be deployed in the network;
    receiving monitoring data including time series of service-level metrics and resource-level metrics of network functions (NFs) of the NS from different domains of the network;
    learning representations of the time series from the different domains with a common dimensionality so as to match different time scales of the time series;
    computing an NS signature of the NS as a cross-correlation matrix comprising cross-correlations between the service-level metrics and the resource-level metrics of the NFs;
    learning embeddings of the NS signature using a model and determining a reconstruction error of the model;
    determining whether the NS is anomalous based on the reconstruction error of the model; and
    identifying the NS as a target for the troubleshooting in a case that the NS was determined to be anomalous.

2. The method according to claim 1, further comprising adding contextual information to the NS signature.

3. The method according to claim 1, further comprising configuring domain controllers of the different domains of the network based on the NSD to monitor the service-level metrics and resource-level metrics of the NFs of the NS.

4. The method according to claim 1, wherein the representations of the time series are learned by auto-encoders, each of the auto-encoders having been trained to learn a respective one of the representations of a respective one of the time series with the common dimensionality such that a higher-dimensional representation is learned for time series having a longer timescale relative to the common dimensionality and lower-dimensional representation is learned for time series having a shorter timescale relative to the common dimensionality.

5. The method according to claim 1, further comprising classifying the anomalous NS into a type of problem based on the reconstruction error of the model and a supervised learning algorithm using prior knowledge of reconstruction errors associated to known problem types.

6. The method according to claim 1, wherein the model is trained to learn the embeddings in three different levels including an embedding of the NS signature per NF, a shared embedding of the NFs per domain of the network, and a shared embedding of all the NFs of the NS.

7. The method according to claim 1, further comprising identifying anomalies per network slice.

8. The method according to claim 1, wherein computing the NS signature further comprises:
    computing cross-correlations within the time series of the resource-level metrics of a same one of the NFs;
    computing cross-correlations between the service-level metrics and the resource-level metrics of the same one of the NFs;
    computing cross-correlations within the time series of the service-level metrics of the NFs; and
    computing long-term dependencies of each of the time series.

9. The method according to claim 1, further comprising ranking the reconstruction error of the NS with reconstruction errors of other NSs, and using the ranking to identify hardware logs and configuration files for inspection.

10. The method according to claim 1, further comprising training the model using reconstruction errors from NSs which have undergone the troubleshooting.

11. The method according to claim 1, wherein the NS signature is computed for different size windows of time.

12. A computer system for anomaly detection and troubleshooting in a network, the system comprising memory and one or more processors which, alone or in combination, are configured to provide for execution of a method comprising:
    parsing a network service descriptor (NSD) describing a network service (NS) to be deployed in the network;
    receiving monitoring data including time series of service-level metrics and resource-level metrics of network functions (NFs) of the NS from different domains of the network;
    learning representations of the time series from the different domains with a common dimensionality so as to match different time scales of the time series;
    computing an NS signature of the NS as a cross-correlation matrix comprising cross-correlations between the service-level metrics and the resource-level metrics of the NFs;
    learning embeddings of the NS signature using a model and determining a reconstruction error of the model;
    determining whether the NS is anomalous based on the reconstruction error of the model; and
    identifying the NS as a target for the troubleshooting in a case that the NS was determined to be anomalous.

13. The system according to claim 12, further comprising a troubleshooting classifier trained to classify the anomalous NS into a type of problem based on the reconstruction error of the model, the troubleshooting classifier having been trained by a supervised learning algorithm using prior knowledge of reconstruction errors associated to known problem types.

14. The system according to claim 12, further comprising a monitor controller having access to the NSD and being operable to configure domain controllers of the different domains of the network based on the NSD to monitor the service-level metrics and resource-level metrics of the NFs of the NS.

15. A tangible, non-transitory computer-readable medium having instructions thereon, which upon execution by one or more processors, alone or in combination, provide for execution of a method for anomaly detection and troubleshooting in a network comprising:

parsing a network service descriptor (NSD) describing a network service (NS) to be deployed in the network;

receiving monitoring data including time series of service-level metrics and resource-level metrics of network functions (NFs) of the NS from different domains of the network;

learning representations of the time series from the different domains with a common dimensionality so as to match different time scales of the time series;

computing an NS signature of the NS as a cross-correlation matrix comprising cross-correlations between the service-level metrics and the resource-level metrics of the NFs;

learning embeddings of the NS signature using a model and determining a reconstruction error of the model;

determining whether the NS is anomalous based on the reconstruction error of the model; and identifying the NS as a target for the troubleshooting in a case that the NS was determined to be anomalous.

* * * * *